Feb. 12, 1957 J. P. CARR 2,780,875
WHEEL ALIGNING GAUGE
Filed March 10, 1953 4 Sheets-Sheet 1
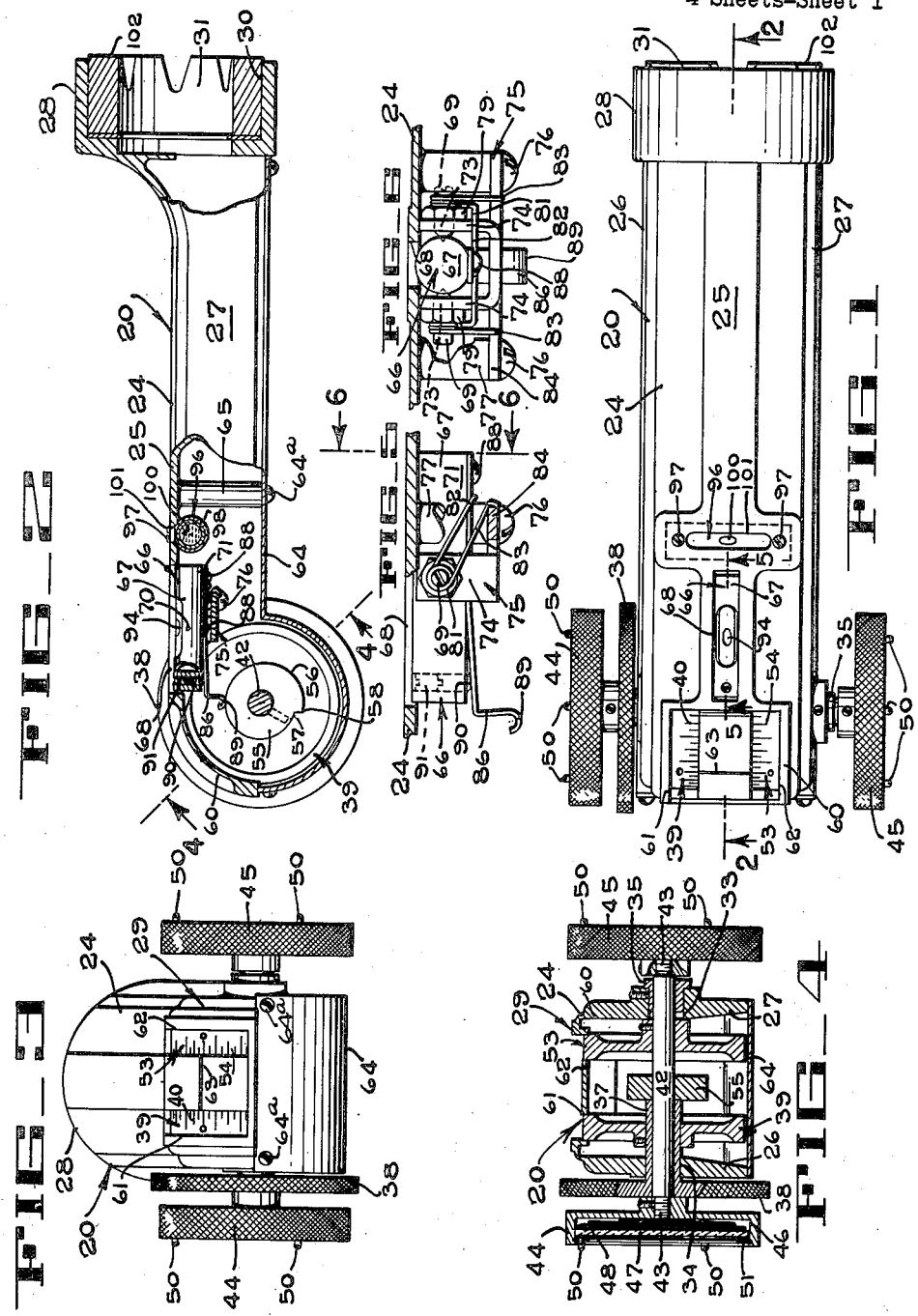
INVENTOR
JAMES P. CARR
BY Hans G. Hoffmeister
ATTORNEY

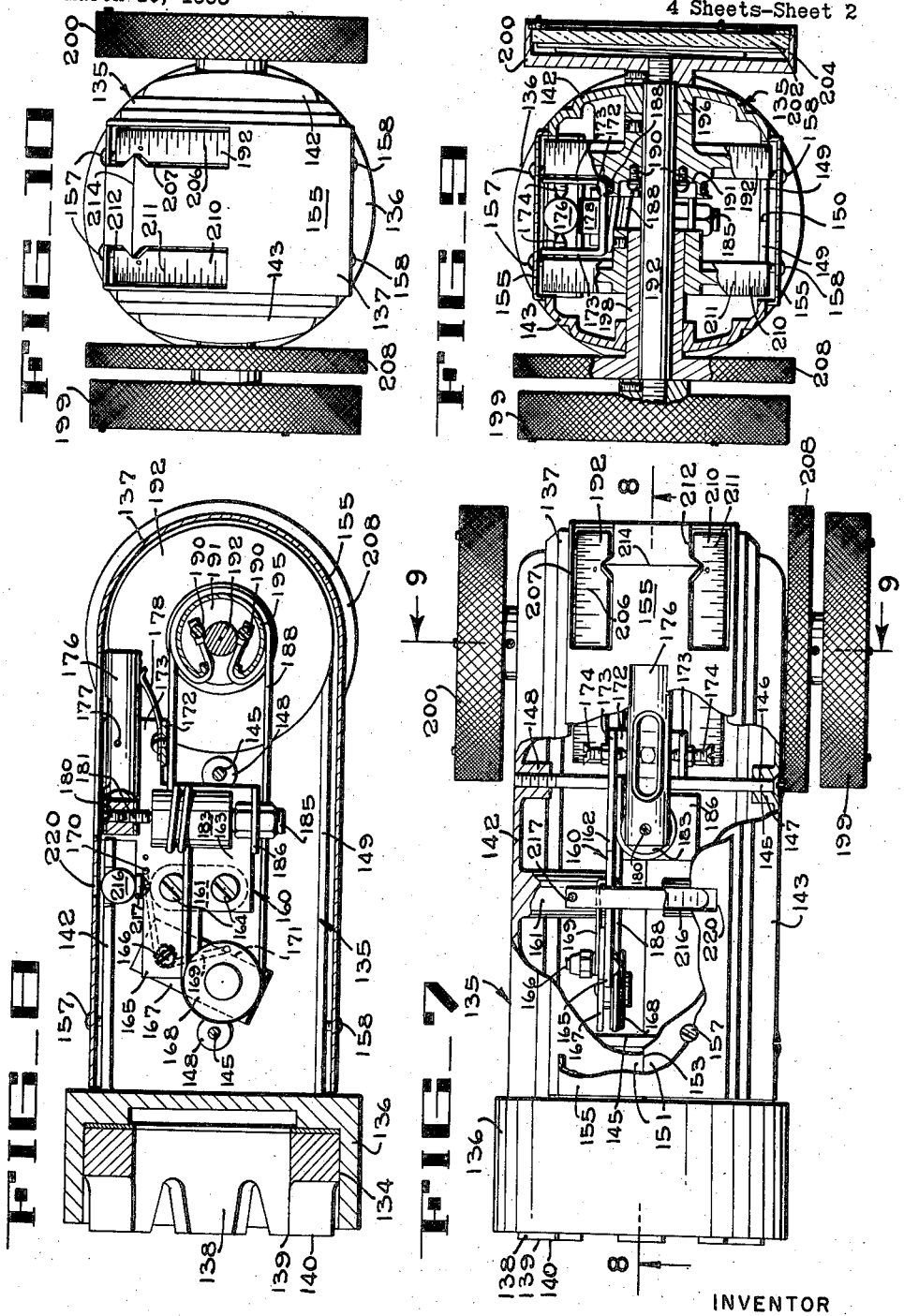

Feb. 12, 1957  J. P. CARR  2,780,875
WHEEL ALIGNING GAUGE
Filed March 10, 1953  4 Sheets-Sheet 3
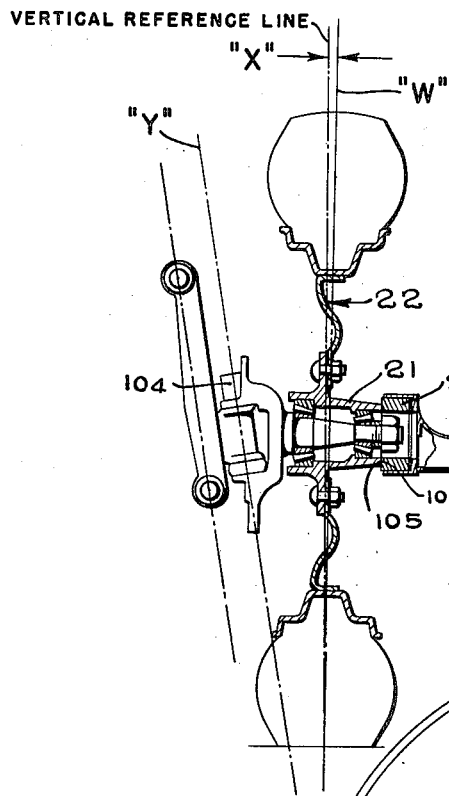
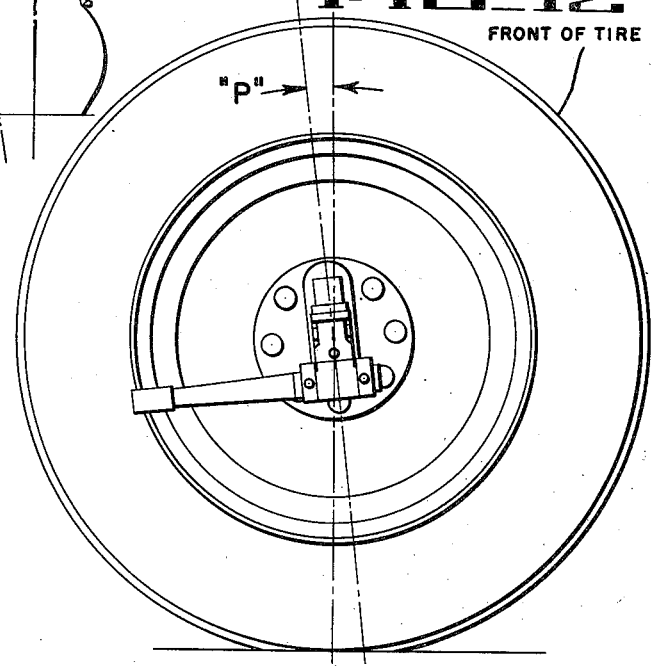
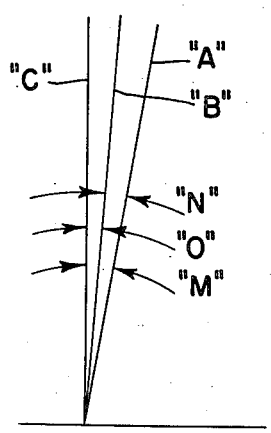
INVENTOR
JAMES P. CARR
BY Hans G. Hoffmeister
ATTORNEY

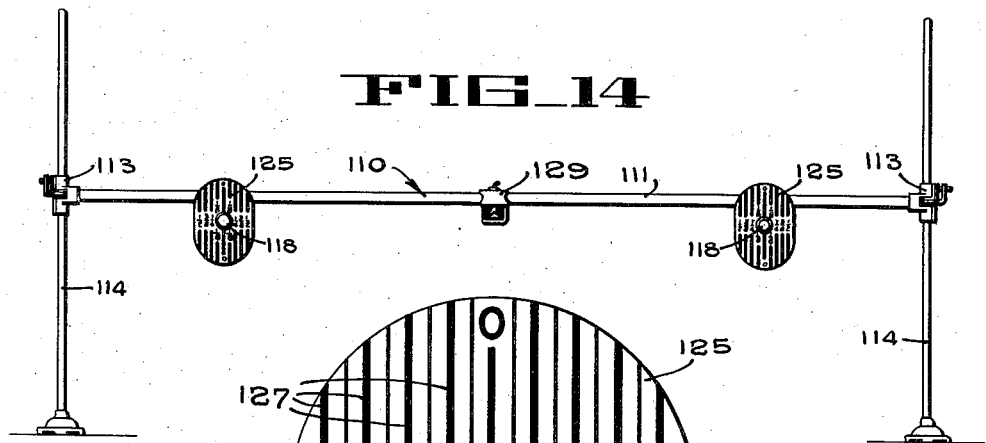
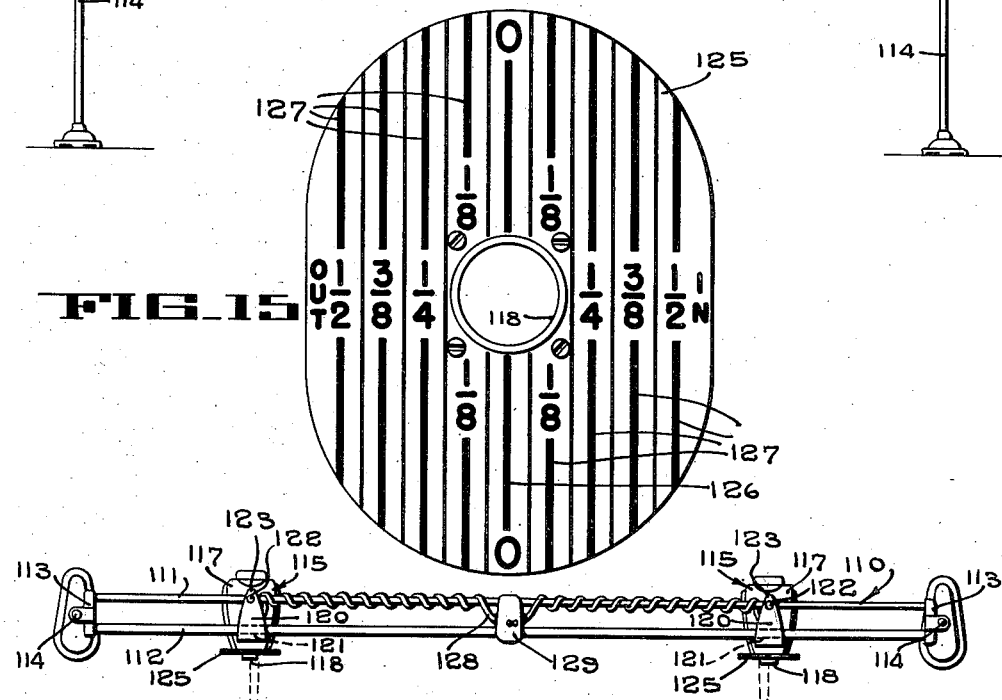
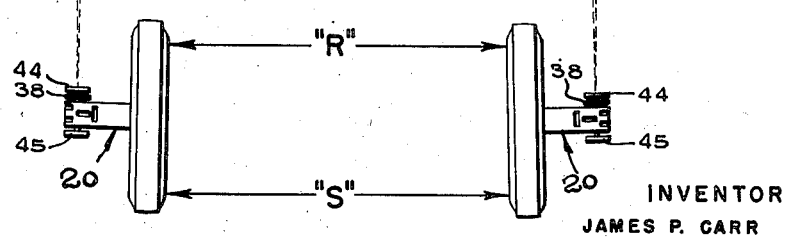

United States Patent Office 2,780,875
Patented Feb. 12, 1957

2,780,875
WHEEL ALIGNING GAUGE

James P. Carr, Lansing, Mich., assignor to Food Machinery and Chemical Corporation, San Jose, Calif., a corporation of Delaware Application March 10, 1953, Serial No. 341,568

7 Claims. (Cl. 33—203.18)

This invention pertains to an apparatus for measuring the alignment characteristics of automobile wheels and more particularly relates to an improved apparatus adapted for checking the camber, caster, and toe-in of the steering wheels of an automobile.

It is an object of the present invention to provide an improved apparatus for checking the alignment characteristics of automobile wheels and to provide an instrument from which all final check results may be read directly without making supplementary calculations.

Another object is to provide a gauge for use in checking the alignment of wheels which is adapted to be mounted directly on a true, accurately finished surface of a wheel.

Another object of this invention is to provide a gauge of simple, rugged construction which is extremely accurate in operation.

These and other objects and advantages of the present invention will become apparent from the following description taken in connection with the accompanying drawings, in which:

Fig. 1 is a plan view of a gauge constructed in accordance with the teachings of the present invention.

Fig. 2 is a vertical longitudinal section of the gauge taken on line 2—2 of Fig. 1, with part of the gauge housing shown in elevation.

Fig. 3 is an elevation of the dial end of the gauge.

Fig. 4 is a vertical transverse section taken on line 4—4 of Fig. 1.

Fig. 5 is a vertical section taken on line 5—5 of Fig. 1.

Fig. 6 is a vertical section taken on line 6—6 of Fig. 5.

Fig. 7 is a plan view, partly shown in section, of a modified form of the gauge of the present invention.

Fig. 8 is a vertical longitudinal section taken on line 8—8 of Fig. 7.

Fig. 9 is a vertical transverse section taken on line 9—9 of Fig. 7.

Fig. 10 is an elevation of the dial end of the gauge of Fig. 7.

Fig. 11 is a vertical transverse section of a wheel mounted on a typical steering knuckle and illustrating the gauge of the present invention mounted on the wheel.

Fig. 12 is a side elevation of an automobile front wheel illustrating the caster angle of the king pin.

Fig. 13 is a diagram illustrating the method used in the present invention to check the caster angle.

Fig. 14 is a front elevation of test apparatus used with the gauge to check the toe-in of the front wheels of an automobile.

Fig. 15 is an enlarged front elevation of a target shown in Fig. 14.

Fig. 16 is a diagrammatic plan illustrating the method used in the present invention to check the toe-in of front wheels.

In Fig. 11 the novel gauge of the present invention is indicated by the reference numeral 20 and is shown in its operative position magnetically clamped to the outer machined surface of the hub flange 21 of a steerable front wheel 22 of an automobile. When the gauge is clamped in this one position, the camber, caster, and toe-in of the wheel may be determined by the manipulation of certain control members on the gauge which will be explained presently.

The gauge 20 (Figs. 1 and 2) comprises an integrally formed housing 24 having a flat top wall 25 (Fig. 4) and side walls 26 and 27 which terminate at one end in a hub-like magnet-supporting portion 28 (Fig. 2) and at the other end in a curved, apertured dial-supporting portion 29. The magnet-supporting portion 28 has a generally cylindrical recess 30 in which a permanent magnet 31 is mounted by a pressed fit. The magnet 31 extends out of the recess a short distance to engage the end surface of the hub flange 21 of the wheel. The dial-supporting portion 29 of the housing has aligned openings 33 and 34 (Fig. 4) in the opposite side walls. A bushing 35 is disposed in the opening 33 and keyed to the side wall 27, while a tubular shaft 37 is rotatably supported in the opposite opening 34. A control wheel 38 is integrally formed on the end of the tubular shaft 37 exteriorly of the housing 24. An indicating wheel 39, having a calibrated caster scale 40 inscribed on its peripheral surface is keyed to the shaft 37 interiorly of the housing portion 29. A solid shaft 42 is rotatably journalled in the tubular shaft 37 and in the bushing 35 and has threaded outer ends 43 on which control wheels 44 and 45 are keyed. Each of the control wheels 44 and 45 has a cylindrical recess 46 in which a mirror 47 with a flat reflecting surface is mounted. A compression spring 48, disposed between the rear wall of the recess 46 and the mirror 47, presses the mirror against three spaced setscrews 50 which extend inwardly through suitable tapped holes (not shown) in a retaining snap ring 51 at the outer edge of the recess 46. Interiorly of the housing, an indicating wheel 53 is keyed to the shaft 42. A calibrated camber scale 54 is inscribed on the peripheral surface of the wheel 53. A cam 55 is also keyed to the shaft 42 interiorly of the housing 24. The cam 55 (Fig. 2) is a constant rise cam having a camming surface 56 which progressively moves away from the center of the shaft 42, beginning at a low point 57 and proceeding in a clockwise direction (Fig. 2) to a high point 58. The top wall 25 of the housing 24 has a curved portion 60 at the dial end in which two spaced, longitudinal windows 61 and 62 (Fig. 1) are provided opposite the caster scale 40 and the camber scale 54, respectively. A line 63 is inscribed transversely on the curved wall portion 60 serving as a reference line for both scales. The bottom wall of the housing 24 is formed by a cover 64 (Figs. 2 and 3) which is secured to the wall at the curved end of the housing by screws 64a and to spaced bosses 65 integrally formed on the inner face of each side wall of the housing.

A spirit level assembly 66 (Fig. 2) is mounted inside the housing 24 near the curved dial end thereof. This assembly includes an elongated level 67 disposed longitudinally of the gauge housing 24 directly below a longitudinal slot 68 in the top wall 25 of the housing. The level is mounted for pivoting movement on a transverse axis by two aligned, oppositely disposed pivot pins 69 (Fig. 6) which extend into sockets 70 (Fig. 2) in the casing 71 of the level. The pivot pins 69 have threaded shanks adjustably engaged in tapped openings 73 (Fig. 6) in spaced, opposed upstanding arms 74 of a saddle 75 that is rigidly secured by screws 76 to bosses 77 which extend downwardly from the top wall of the gauge housing 24. The pivot pins are locked in adjusted position by lock nuts 79. The level 67 is urged in a counterclockwise pivoting direction (Fig. 2) by a torsion spring 81 (Figs. 5 and 6) which is anchored centrally on the shanks of the pivot pins 69 and has a cross-member 82 disposed under the level 67 and curved end portions 83 disposed against a transverse bar 84 of the stationary saddle 75. This counterclockwise movement is limited by a spring arm 86 (Fig. 5), one end of which extends under the level 67 and is secured thereto by screws 88. At its other end the spring arm 86 is curved to provide a cam follower 89 that is adapted to ride along the camming surface 56 of the cam 55 that is keyed to the shaft 42 (Fig. 2). The resiliency of the spring arm 86 holds it against an adjustable setscrew 90 which projects out of a vertical tapped opening in the casing of the level 67. A second setscrew 91 locks the first setscrew in selected position. It will be apparent that rotation of the cam 55, through manipulation of either control wheel 44 or 45, will cause a corresponding pivoting adjustment of the level 67. In this manner a bubble 94 (Fig. 2), which serves in the level 67 as an indicator, may be quickly brought to the center position which indicates the horizontal positioning of the level 67.

In order that the flat top wall 25 of the gauge housing 24 may be positioned in a generally horizontal plane so that the indicator wheels 39 and 53 are visible from above, prior to making adjustments of the gauge incident to checking wheel alingment, a second spirit level assembly 96 is mounted transversely in the housing 24 by screws 97 that extend through small openings (not shown) in the top wall of the housing and engage tapped holes in the metal casing 93 of the level assembly 96. This level may be of standard construction having a bubble 100 (Fig. 1) which serves as an indicator and is visible through a transverse slot 101 in the top wall, said bubble being adapted to be moved into alignment with the usual hairline on the glass tube of the level. This preliminary leveling of the gauge is made by rotating the gauge about an axis parallel to the axis of the hub of the automobile wheel.

When the gauge 20 is originally assembled it is adjusted so that when the true surface 102 (Fig. 2) of the magnet is disposed in a vertical plane, the indicator bubble 94 of the level 67 will be in its central position, as indicated in Fig. 1, and the zero marker of the camber scale 54 will be opposite the reference line 63 inscribed in the housing. Thereafter, if the magnet surface 102 is inclined from the vertical, the bubble may be again centered by rotating the control wheels 44 and 45 which operate the cam 55. Since the wheel 53 carrying the camber scale 54 is also keyed to the shaft 42 and the scale is calibrated in degrees of angular inclination, the number of degrees that the magnet surface 102 is displaced from vertical may be read directly on the camber scale 54.

Camber measurement

Camber is the amount in degrees that each front wheel of an automobile is inclined outward at the top. This angle is represented by the reference letter X in Fig. 11. As is well known, the closer the center of the tire comes to resting at the point where a line Y (Fig. 11), through the center of the king pin 104, would strike the road, the easier the car will steer. By inspecting Fig. 11, it will be seen that the machined surface 105 of the hub flange 21, against which the magnet 31 is held, is disposed in a plane parallel to the center axis of the tire, represented by the reference letter W. Thus, a measurement of the inclination from the vertical of the surface of the hub flange 21 will also be a measurement of the camber angle of the wheel. To measure the inclination of the surface 105, the gauge 20 is positioned in magnetic engagement with the hub. The bubble 94 of the level 67 will move away from its center position due to the fact that the magnet surface is no longer in a vertical plane. The zero marker of the camber scale will, of course, remain opposite the reference line 63. To bring the bubble 94 back to center position the cam 55 is rotated by turning either control wheel 44 or 45. The camber scale wheel 53 will also rotate with the shaft 42 and the camber scale 54 will indicate the angular movement of the level 67 necessary to bring the bubble 94 to center position. This reading on the camber scale indicates the camber angle.

Caster measurement

Caster is the amount in degrees of the backward tilt of the king pin. The caster angle is indicated in Fig. 12 by the reference letter P. The method used in the present invention for checking the caster angle is disclosed in the U. S. patent to Starr No. 1,985,330. In applying this method the wheel is turned first right and then left an equal amount (say 20°) from the straight ahead position. Any caster in the king pin will tend to neutralize the camber of the wheel when the wheel is turned in and lies in a plane in advance of the king pin, and the angular reading will be decreased. When the wheel lies behind the king pin, turned out, the caster angle supplements the camber angle and the gauge reading will be increased. By subtracting the gauge reading with the wheel turned in from the gauge reading with the wheel turned out, the caster angle may be determined. When the gauge 20 of the present invention is used, the step of subtracting one reading from the other is eliminated since this gauge gives the caster angle reading direct. After the gauge has been applied to the hub flange 21 of the wheel, the wheel is turned out 20° and the indicator bubble 94 of the level 67 is brought to center position by rotating either the wheel 44 or 45. While the control wheels 44 and 45 are held stationary, the caster scale 40 is rotated by means of the control wheel 38 to place the zero of the caster scale opposite the reference line 63. In this manner, the plane of the wheel in the turned out position is made the new reference plane and, thereafter, when the inclination of the wheel in another revolved position is measured, the reading on the scale 40 will indicate degrees of inclination from the new reference plane. Thus, with the plane of the wheel in the turned out position as the new reference plane, the wheel is turned back through the straight ahead position to a position turned inward 20°. The bubble 94 of the level 67 is brought back to center position by grasping both control wheels 38 and 44 and rotating them together. When the bubble 94 is in center position, the caster scale, which has been calibrated for testing caster by rotating the wheel 20° in either direction, will indicate in degrees the difference in inclination of the turned out position and the turned in position. In the diagrammatic sketch (Fig. 13), A represents the plane of the wheel turned out; B represents the plane of the wheel turned in; and C represents the vertical reference plane. In the Starr patent, the caster angle is defined as the camber angle at the turned out position minus the camber angle at the turned in position. Accordingly, the apparatus disclosed by Starr is adapted for first measuring angle M, and then measuring the angle O. When angle O is subtracted from M, the caster angle N is obtained. By using the gauge 20 of the present invention, the turned out angle M is first measured and then, by using the plane of the wheel in the turned out position as a new reference plane, the angle N is obtained directly on the caster scale.

In Figs. 14 and 15, apparatus 110 is illustrated which may be used with the gauge 20 of the present invention to check the toe-in of automobile front wheels. Toe-in is an adjustment whereby the distance between the front wheels of an automobile is less at the front of the wheels than it is at the rear of the wheels. Thus, in Fig. 16 the distance R is less than the distance S. The apparatus 110 comprises two spaced bars 111 and 112 supported in a horizontal plane by adjustable clamps 113 which connect the bars to two vertical, spaced, rigid standards 114. Two light projectors 115 are mounted on the bars 111 and 112. Each projector 115 has a housing 117 in which the light source and the projecting apparatus are mounted and arranged to project a beam of light and an image of a crosshair through an opening 118 in the forward end of the housing 117. A mounting bracket 120, secured to the top surface of the housing 117, has a transverse opening 121 arranged to pivotally receive the forward bar 111. A screw 122, threaded through an opening in a rearwardly extending flange 123 of the bracket 120, bears against the top of the rear bar 112. By manipulating the screw 122, the pivoted position of the projector 115 on the front bar 111 may be varied. Setscrews (not shown) are provided to lock the projector in the selected position. The two light projectors are so constructed that, when mounted on the bars 111 and 112, they project parallel beams of light. A target 125 is mounted on the forward end of each projector 115. Each target has a central vertical reference stripe 126 marked "zero" and additional equi-spaced stripes 127 on each side of the zero stripe calibrated in fractions of an inch. The optical light ray system of the projector 115 is arranged to magnify the toe-in variations between wheels five times so that exact readings may be easily made on the correspondingly large target 125. Each projector is connected to a source of electric power through a conductor 128 and a control box 129 mounted on the cross bars 111 and 112.

Toe-in measurement

A gauge 20 is mounted on the hub of each front wheel as indicated in Fig. 16. The wheels are put in a straight ahead position with the projectors and the targets spaced equal distances forwardly from the wheels. If desired, the wheels may be run up on aligned turntables of any standard construction. The projector lights are turned on and the positions of the projectors are adjusted so that the projected beam from each projector will strike the flat surface of the mirror 47 on the face of the control wheel 44 of the associated gauge 20 and an image of the crosshair will be reflected back on the target. Since the projected beams are parallel, if the flat mirror surfaces were exactly normal to the beams, the reflected crosshair image would lie on the zero stripe of the target. However, the front wheels are "toed-in" and therefore the crosshair reflected from each mirror 47 will hit the target inwardly of the zero stripe. Now if the left front wheel is turned outward so that the reflected crosshair is moved to a position on the zero stripe of the associated target, the right front wheel will also move through the same angle and the crosshair image will move further inwardly to a point on the target which will indicate the total angular relation of the mirrors and the beams. This total angular relation is the angular measurement of the toe-in, and this angular measurement is automatically converted to a linear measurement of the difference between the distance R and S (Fig. 12) by the calibrations on the target.

In Figs. 7, 8, 9 and 10 a modified form of the novel gauge of the present invention is illustrated. The gauge comprises a housing 135 (Fig. 7) having a hub-like magnet-supporting portion 136 at one end and a curved dial-supporting portion 137 at the other end. The magnet-supporting portion 136 has a generally cylindrical recess 134 (Fig. 8) in which a permanent magnet 138 is pressed. An end portion 139 of the magnet extends out of the recess 134 and provides a true surface 140 which is adapted to be positioned against the true end surface of the hub flange of an automobile wheel. One side of the housing 135 is formed by a member 142 (Fig. 7) integrally formed with the magnet-supporting portion 136 and extending forwardly therefrom to the dial end of the housing. The opposite side of the housing is formed as a removable member 143 which has substantially the same configuration as the side member 142, with the exception that the parts of the member 143 are disposed opposite to the parts of the side member 142. The removable member 143 is secured to the side member 142 by bolts 145 which extend through openings 146 in bosses 147 in the member 143 and are threaded into tapped holes in bosses 148 in the side member 142. At their lower edges the two side members 142 and 143 have transverse flanges 149 (Fig. 9) extending inwardly of the housing 135 into abutting contact at 150. These flanges extend for a major portion of the length of the housing and serve to space the side members 142 and 143 apart at their lower edges. At their upper edges, the side members have transverse flanges 151 (Fig. 7) extending inwardly of the housing into abutting contact at 153. An elongated U-shaped cover 155 (Figs. 8 and 10) forms the top, bottom and end walls of the housing 135. The cover is secured to the flanges 151 by capscrews 157 and to the flanges 149 by capscrews 158.

Before the removable side member 143 and the cover 155 are secured in place, a control unit 160 is mounted on a boss 161 (Fig. 8) that extends inwardly from the wall of the side member 142. The unit 160 comprises a mounting plate 162 having a central flat portion 163 through which capscrews 164 extend for securing the plate 162 to the boss 161. An arm 165 of the plate 162 projects toward the magnet end of the housing and is provided with an aperture (not shown) through which a bolt 166 extends. A lever 167, which is pivotally mounted on the bolt 166, rotatably supports a pulley 168 near its free end. The lever 167 is urged in a clockwise direction (Fig. 8) by a torsion spring 169 which has a central coil disposed around the bolt 166, one end anchored in a hole 170 in the plate portion 163 and the other end bearing against an edge 171 of the lever 167. As best seen in Fig. 9, the end of the mounting plate 162 nearest the dial end of the housing 135 is U-shaped and has a base member 172 and two upstanding spaced arms 173 through which pivot pins 174 (Fig. 7) extend. Each pin 174 has a threaded shank engaged in a tapped hole (not shown) in one of the arms 173. Since the holes are aligned, the pivot pins provide a pivot axis for a level 176 that has sockets 177 (Fig. 8) for receiving the pointed ends of the pins. The level is urged in a counterclockwise direction (Fig. 8) by a leaf spring 178 which is anchored on the base member 172 and engages the bottom surface of the level 176 near one end. At the opposite end of the level, two setscrews 180 and 181 are threaded in a tapped opening in the casing of the level. The lower screw 181 extends to a point below the level 176 and rests on the top surface of a drum 183 which is adjustably mounted on a stud 185 anchored in a flange 186 that projects outwardly from the plate 162. The drum 183 has a central tapped opening (not shown) in its lower end into which the threaded end of the stud 185 extends so that rotation of the drum 183 effects a raising or lowering of the drum and pivoting of the level 176.

The drum 183 is rotated by means of a cord 188 (Fig. 8) which is wrapped around the drum, trained over the pulley 168 and secured by capscrews 190 in a recess 191 in the hub of a wheel 192 that is keyed to a shaft 193 (Fig. 9). The recess 191 is defined by a circular wall 195 (Fig. 8), the exterior surface of which forms a drum around which the cord 188 is wound. The shaft 193 is journalled for rotation in a boss 196 in the side member 142 of the housing and in a tubular shaft 198 extending inwardly from the side member 143. Control wheels 199 and 200 are keyed to the ends of the shaft 193 exteriorly of the housing 135. A mirror 202 is mounted in a recess 204 in each control wheel in the manner described in connection with the control wheels 44 and 45 of Fig. 4.

It will be apparent that rotation of either control wheel 199 or 200 will effect pivotal movement of the level 176 and accordingly the usual bubble in the level may be centered by means of these wheels. A camber scale 206, calibrated in degrees of angular inclination, is inscribed on the periphery of the wheel 192 which is disposed opposite a window 207 (Fig. 7) provided in the housing 135. Another control wheel 208 is integrally formed on one end of the tubular shaft 198, exteriorly of the housing 135. Inside the housing, an indicating wheel 210 is keyed to the tubular shaft in a position wherein a caster scale 211 inscribed in its periphery is disposed opposite a second window 212 (Fig. 7) in the housing. A line 214 inscribed on the housing 135 between the windows 207 and 212 serves as a reference line for both scales.

A second level 216 (Fig. 8) is mounted transversely of the housing on a bar 217 that is secured by welding to the top edge of the mounting plate 162. The level 216 is disposed directly below a transverse window 220 (Fig. 7) in the top wall of the housing 135.

The modified gauge disclosed in Figs. 7, 8, 9 and 10 is applied to the hub flange of a wheel for checking camber, caster and toe-in in exactly the same manner as described in connection with the gauge 20 of Figs. 1, 2, 3 and 4.

From the foregoing description of the two forms of the gauge and of the method of using the same, it will be apparent that the gauge of the present invention is an exceedingly simple and compact tool and that the adjustments of the gauge can be readily made by a relatively inexperienced operator. Since the readings can be made directly on the various scales, no mistakes in calculations are possible. Also, it is to be noted that in both forms of the gauge, the indicating dial-type scales are close to the movable bubble of the level and are disposed in planes substantially parallel to the pivoting plane of the level. With this arrangement, the operator can read the scale instantly after bringing the bubble of the level to centered position without changing position or inclining his head at an angle. Thus, accurate readings may be made immediately while the bubble is still centered.

It will be understood that modifications and variations may be made without departing from the scope of the present invention.

Having thus described my invention, what I claim as new and desire to protect by Letters Patent is:

1. A gauge for checking the alignment of vehicle wheels comprising a support member having a reference surface adapted to be held in planar engagement with a true surface of a vehicle wheel, a level pivotally mounted on said support member for adjusting movement in a fixed plane and having indicator means arranged to assume a centered position when said reference surface is in a vertical plane and to move away from said centered position when said reference surface is inclined from the vertical, a first shaft rotatably journalled in said support member, a first dial keyed on said first shaft, a second shaft mounted on said support member for rotation about the same axis as said first shaft but arranged to be rotated either independently of or in unison with said first shaft, a second dial keyed to said second shaft, and a displaceable actuating member in engagement with said level at a point spaced from the pivot axis thereof and mounted for movement in a linear direction to pivot said level, and means operatively connected between one of said shafts and said actuating member and arranged to convert rotary movement of said one shaft to linear displacement of said actuating member.

2. A gauge for checking the alignment of vehicle wheels comprising a support member having a reference surface, means for mounting said support member on a vehicle with the reference surface abutting a true surface of the wheel, means for indicating the inclination of said reference surface including a spirit level pivotally mounted on said support member and having a bubble disposed in a centered position when said reference surface is in a vertical plane, a tubular shaft journalled on said support member, a first dial keyed to said tubular shaft, a solid shaft journalled in and extending through said tubular shaft, a second dial keyed to said solid shaft, and means operatively connected between said solid shaft and said level arranged to convert rotary movement of said solid shaft to pivoting movement of said level, said second dial being movable as said level is pivoted to indicate the degree of movement of said level and said first dial being rotatably adjustable independently of said level and of said second dial.

3. A gauge for checking the alignment of automobile front wheels comprising an elongated hollow housing having a window at one end and a flat exterior reference surface at the other end adapted to be held in planar engagement with a true surface of a vehicle wheel, a spirit level mounted in said housing adjacent the opposite end of the housing for pivoting movement in a fixed plane longitudinally of said housing, indicator means on said level arranged to assume a centered position when said flat reference surface is disposed in a vertical plane and being movable away from said centered position when said reference surface is inclined from the vertical, a shaft extending transversely through said housing and journalled for rotation in the walls thereof, a support member mounted in said housing and having a threaded portion extending upwardly toward one end of said level, a drum rotatably mounted on said threaded portion and movable into abutting contact with said one end of said level to pivot the level as the drum is rotated in one direction on said threaded portion, a cord connected between said drum and said shaft and arranged to rotate said drum as said shaft is rotated, a dial keyed to said shaft for rotation therewith disposed inside said housing opposite said window, and spring means disposed between said level and said housing and arranged to resist the pivoting movement of said level under the urging of said drum.

4. A gauge for checking the alignment of a vehicle wheel comprising an elongated hollow housing having spaced windows at one end and a flat exterior reference surface at the other end adapted to be held in planar engagement with a true surface of a vehicle wheel, a spirit level mounted in said housing adjacent the window end of said housing for pivoting movement in a fixed plane longitudinally of said housing, indicator means on said level arranged to assume a centered position when said flat reference surface is disposed in a vertical plane and being movable away from said centered position when said reference surface is inclined from the vertical, a tubular shaft journalled for rotation in said housing, a first wheel keyed to said tubular shaft interiorly of said housing and disposed directly opposite one of said windows, a scale on the periphery of said wheel, a solid shaft rotatably journalled in said tubular shaft, a second wheel keyed to said solid shaft interiorly of said housing, a scale on the periphery of said second wheel directly opposite the other window in said housing, and motion transmitting means operatively disposed between said solid shaft and said level and arranged to convert rotary movement of said solid shaft to pivoting movement of said level.

5. A gauge for checking the alignment of vehicle wheels comprising a support member having a reference surface, means for mounting said support member on a vehicle with the reference surface abutting a true surface of the wheel, means for indicating the inclination of said reference surface including a spirit level pivotally mounted on said support member and having a bubble disposed in a centered position when said reference surface is in a vertical plane, a tubular shaft journalled on said support member, a first dial keyed to said tubular shaft, a solid shaft journalled in and extending through said tubular shaft, a second dial keyed to said solid shaft, and means operatively connected between said solid shaft and said level and arranged to convert rotary movement of said solid shaft to pivoting movement of said level.

6. A gauge for checking the alignment of automobile front wheels comprising an elongated hollow housing having a window at one end and a flat exterior reference surface at the other end adapted to be held in planar engagement with a true surface of a vehicle wheel, a spirit level mounted in said housing for pivoting movement in a fixed plane longitudinally of said housing, indicator means on said level arranged to assume a centered position when said flat reference surface is disposed in a vertical plane and being movable away from said centered position when said reference surface is inclined from the vertical, a shaft extending transversely through said housing and journalled for rotation in the walls thereof, a support member mounted in said housing and having a threaded portion extending upwardly toward one end of said level, a drum rotatably mounted on said threaded portion and movable into abutting contact with said one end of said level to pivot the level as the drum is rotated in one direction on said threaded portion, and a cord connected between said drum and said shaft and arranged to rotate said drum as said shaft is rotated.

7. A gauge for checking the alignment of vehicle wheels comprising a support member having a reference surface adapted to be held in planar engagement with a true surface of a vehicle wheel, a level pivotally mounted on said support member for adjusting movement in a fixed plane and having indicator means arranged to assume a centered position when said reference surface is in a vertical plane and to move away from said centered position when said reference surface is inclined away from the vertical, a first shaft rotatably journalled in said support member, a first dial keyed on said first shaft, a second shaft mounted on said support member in coaxial relation with said first shaft for rotation either independently of or in union with said first shaft, a second dial keyed to said second shaft, a first control member keyed to said first shaft, spaced control members keyed on said second shaft, one of said spaced control members being disposed remote from said first control member and the other said spaced control member being disposed close to said first control member for selective movement therewith, and an actuating member in engagement with said level at a point spaced from the pivot axis thereof, and means operatively connected between one of said shafts and said actuating member and arranged to convert rotary movement of said one shaft to pivoting adjustment of said level.

References Cited in the file of this patent

UNITED STATES PATENTS

| | | |
|---|---|---|
| 1,974,006 | Bennett | Sept. 18, 1934 |
| 2,438,358 | Castiglia | Mar. 23, 1948 |
| 2,608,000 | Castiglia | Aug. 26, 1952 |
| 2,645,860 | Bender et al. | July 21, 1953 |

FOREIGN PATENTS

| | | |
|---|---|---|
| 5,412 | Great Britain | 1912 |
| 827,831 | France | Feb. 2, 1938 |